(12) United States Patent
Wang (10) Patent No.: US 6,345,975 B1
(45) Date of Patent: Feb. 12, 2002

(54) ARM STRUCTURE FOR AN INJECTING MOLDING MACHINE

(75) Inventor: Jui-Hsiang Wang, Yung Kang (TW)

(73) Assignee: HWA Chin Machinery Factory Co., Ltd., Tainan Hsien (TW)

( * ) Notice: Subject to any disclaimer, the term of this patent is extended or adjusted under 35 U.S.C. 154(b) by 0 days.

(21) Appl. No.: 09/552,666

(22) Filed: Apr. 19, 2000

(51) Int. Cl.$^7$ .............................................. B29C 45/64
(52) U.S. Cl. .................... 425/192 R; 100/281; 425/593
(58) Field of Search ............................ 425/192 R, 593, 425/451.6; 100/281

(56) References Cited

U.S. PATENT DOCUMENTS

| | | | | |
|---|---|---|---|---|
| 4,773,845 A | * | 9/1988 | Nagura et al. | 425/593 |
| 5,123,834 A | * | 6/1992 | Joyner | 425/593 |
| 5,971,743 A | * | 10/1999 | Virginio | 425/593 |

* cited by examiner

Primary Examiner—James P. Mackey
(74) Attorney, Agent, or Firm—Rosenberg, Klein & Lee (57) ABSTRACT

An arm structure for an injecting molding machine includes arms consisting of two pairs of two arms respectively having plural parallel pivotal plates having two ends pivotally connected with plural position plates of a receiving disc and a movable mold base. Each position plate has an outer end concave surface with a threaded hole. Each pivotal plate has an outer end is bored with a pivot hole and fits in a gap between every two position plates. Further, a tubular pivot has plural through holes spaced apart corresponding to the threaded holes of said outer end concave surfaces of the position plates for bolts to pass through and screw with the threaded holes. Then the arm structure is pivotally connected to the receiving disc and the movable mold base. Therefore, the arm structure is easily assembled with or disassembled from the receiving disc and the movable mold base by only screwing off the bolts, without need of removing the connecting rods.

1 Claim, 8 Drawing Sheets

ARM STRUCTURE FOR AN INJECTING MOLDING MACHINE

BACKGROUND OF THE INVENTION

This invention relates to an arm structure for an injecting molding machine, particularly to one not needing to take off a connecting rod in removing an arm structure from a receiving disc and a movable mold base.

Figure 7:
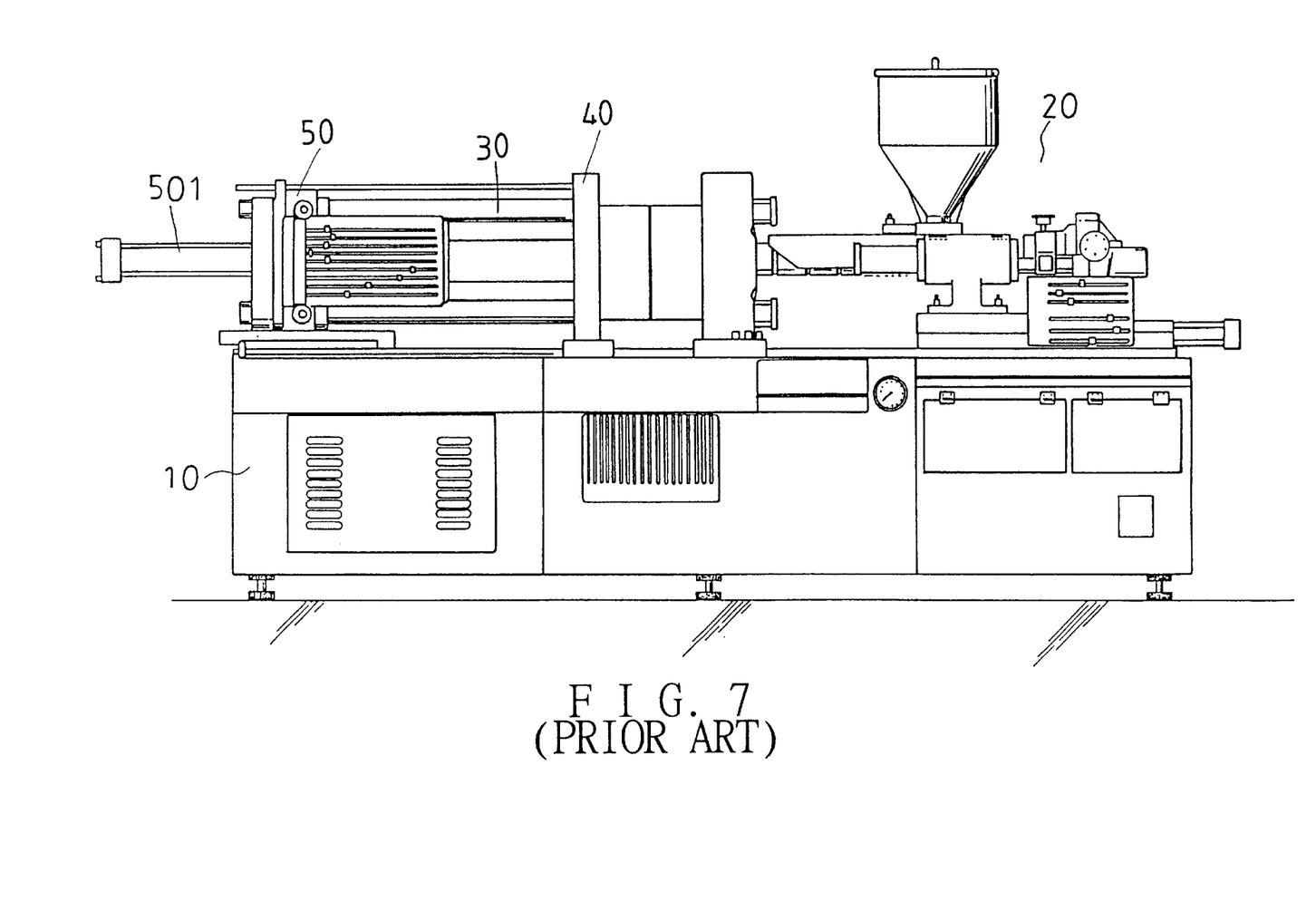
FIG. 7 is a side view of a known conventional injecting molding machine.

A conventional injecting molding machine with an arm structure shown in FIG. 7, includes a table 10, an injecting structure 20 fixed on one side of the table 10, and a movable mold base 40 and a receiving disc 50 combined with through holes at four corners by means of connecting rods 30 on the other side of the table 10. The movable mold base 40 is connected to a piston rod of an oil pressure cylinder 501 connected with the arm structure and the receiving disc 50. The oil pressure cylinder 501 operates to move the movable mold base 40 to open and close the mold.

Figure 8:
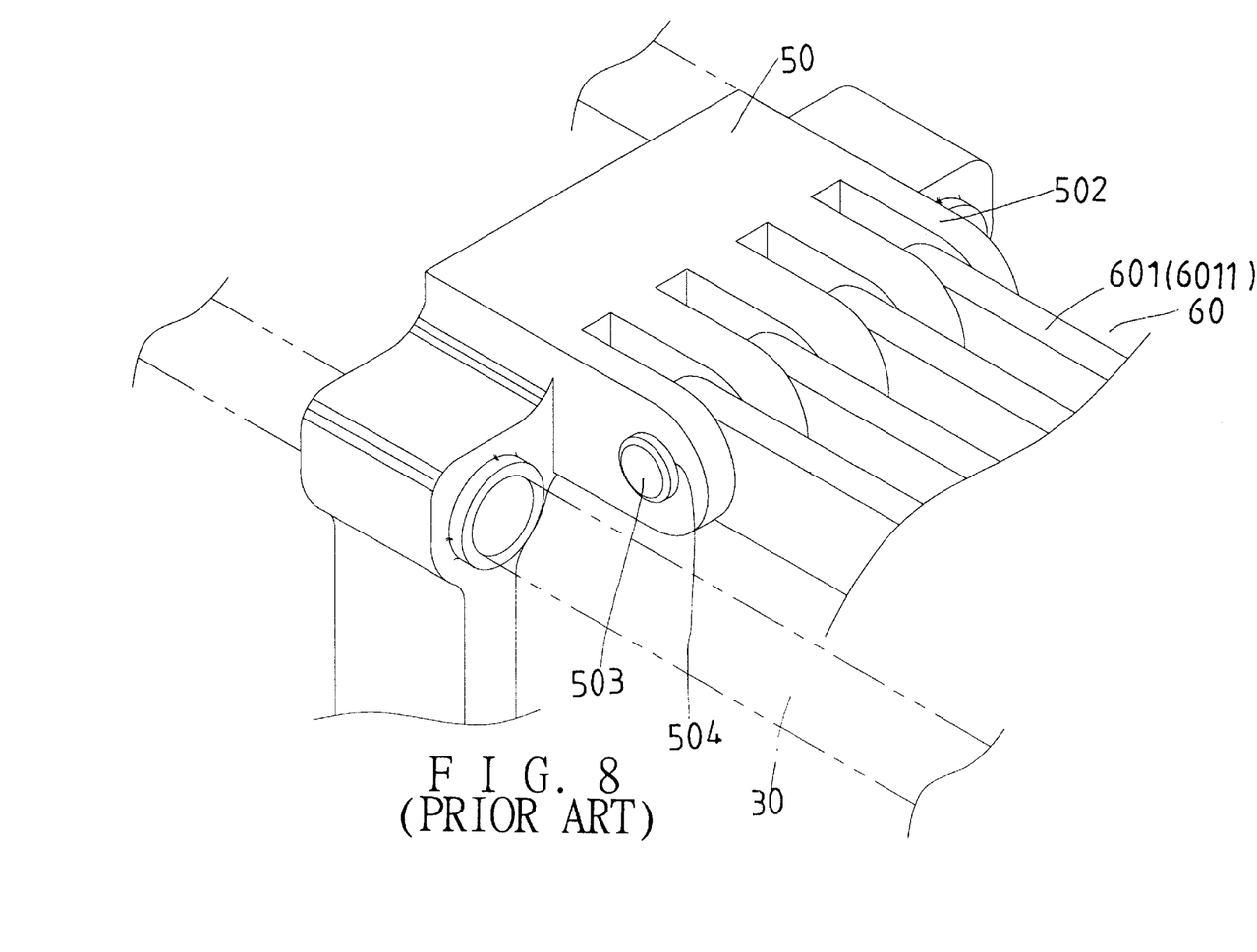
FIG. 8 is a perspective view of an arm structure of the known conventional machine shown in FIG. 7.

The arm structure has arms 601 consisting of pivotal plates 6011 respectively having first ends fitted between two position plates 502, as shown in FIG. 8, wherein the receiving disc 50 is shown as an example of pivotally connected to the am structure. The movable mold base 40 is also pivotally connected to the arm structure in the same way. It is not described and not shown in Figures. Then a long pivot 503 passes through pivot holes 504 of the receiving disc 50 (or the movable mold base 40) and pivot holes (not shown in Figures) of each pivotal plate 6011. Thus, the two ends of the arms 601 of the arm structure are respectively and pivotally connected to the receiving disc 50 and the movable mold base 40.

However, this kind of arm structure has been used for years and it is not very convenient when the arm structure is to be taken off or to be assembled together as the connecting rods have to be first disassembled from the movable mold base or from the receiving disc and then the pivot 503 can be taken off to let the arm structure removed. This complicated pivotal connection involves much work and time in assembling and disassembling the arm structure with and from the movable mold base and the receiving disc.

Figure 9:
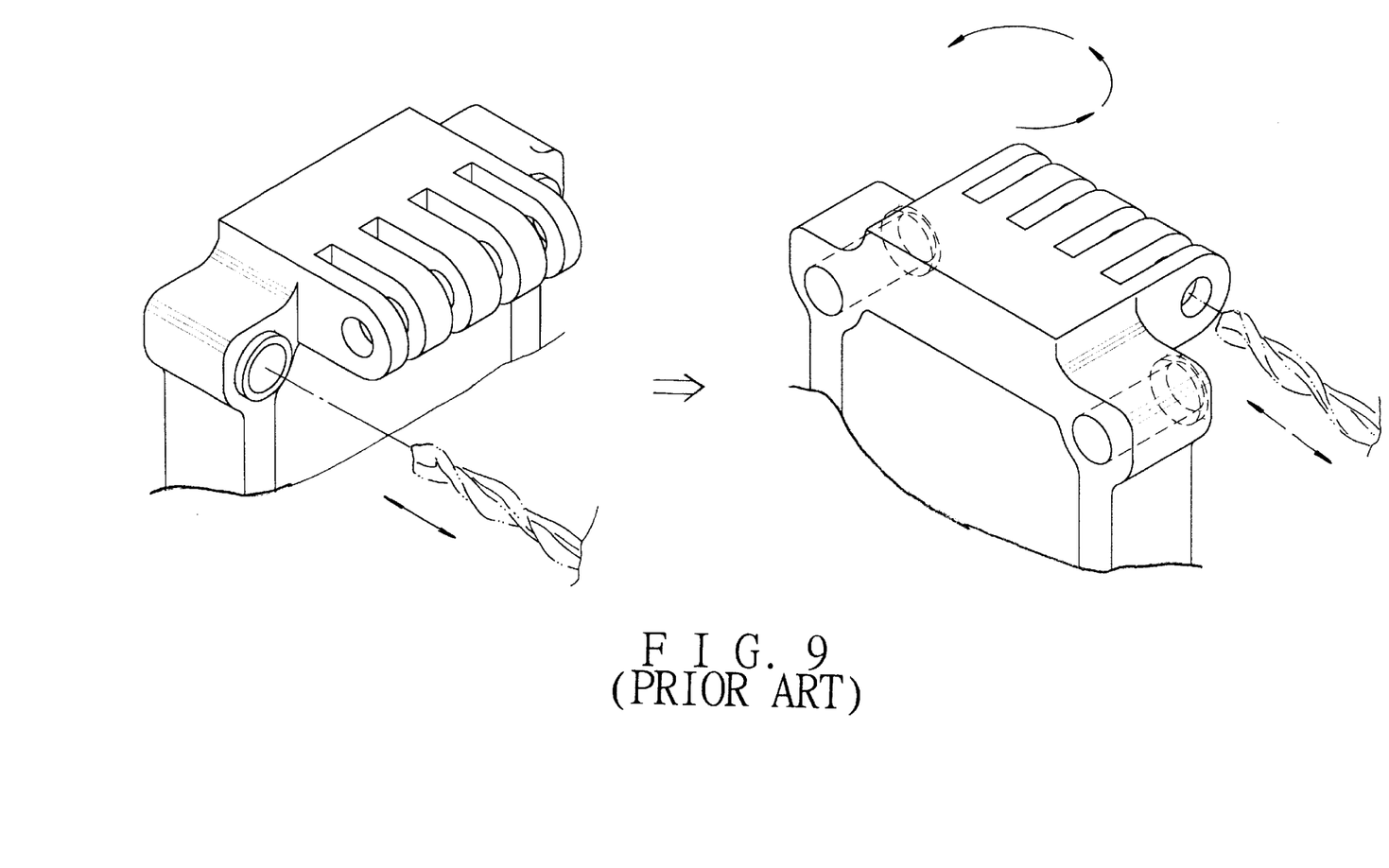
FIG. 9 is a perspective view of processing the arm structure of the known conventional injecting molding machine.

In addition, each position plate 502 has the through hole vertical to form 90° against the receiving disc 50 and the movable mold base 40 so in boring the through holes of all position plates 502 or the same holes in the movable mold base, the receiving disc 50 or the movable mold base 40 has to be fixed on the surface of a boring machine and have to be aligned accurately for boring the through (pivot) holes of the position plates. Then the receiving disc 50 or the movable mold base 40 is turned for 90° and then aligned accurately for boring the through holes of the receiving disc or the movable mold base (or those in the position plates), as shown in FIG. 9.

As can be understood from what is described, in boring the pivot holes or the through holes of the receiving disc 50 and the movable mold base 40, it requires two times of alignment and correct boring with little errors resulting in much time and work.

SUMMARY OF THE INVENTION

This invention has been devised to offer an arm structure for an injecting molding machine, wherein a receiving disc and a movable mold base respectively have plural parallel position plates, which respectively have an outer end concave surface bored with a threaded hole, and an arm structure consists of two pairs of two arms—a first and a second one—positioned at two sides of the receiving disc and the movable mold base.

The first and the second arm respectively have plural parallel pivotal plates, and an outer end of each parallel pivotal plate fits in a gap defined by every two position plates of the receiving disc and the movable mold base. Then a tubular pivot respectively passes through the outer ends of the plural parallel pivotal plates and also fits in the concave end surfaces of the parallel position plates. Further, each tubular pivot has plural through holes corresponding to the threaded holes of the outer end concave surfaces of the parallel position plates of the receiving disc and the movable mold base for bolts to pass through the through holes and screw with the threaded holes for assembling the arm structure with the receiving disc and the movable mold base. Thus, the arm structure is pivotally connected between and to the receiving disc and the movable mold base. Therefore, the arm structure can be assembled with or disassembled from the receiving disc and the movable mold base only by taking off the bolts passing through each tubular pivot and screwing off the threaded holes.

BRIEF DESCRIPTION OF THE DRAWINGS

This invention will be better understood by referring to the accompanying drawings, wherein.

DETAILED DESCRIPTION OF THE PREFERRED EMBODIMENT

Figure 1:
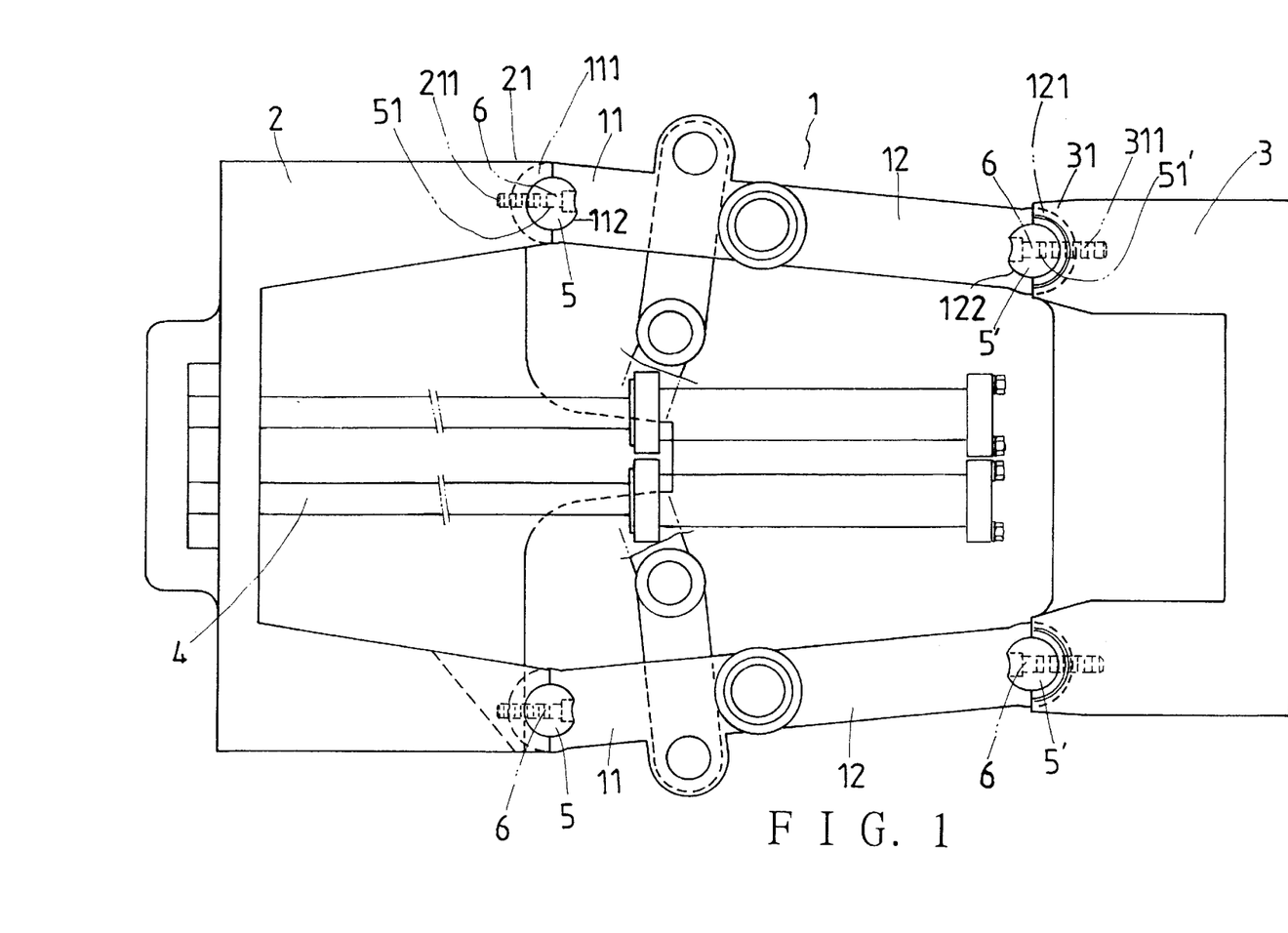
FIG. 1 is a front view of an arm structure for an injecting molding machine of the present invention.

A preferred embodiment of an arm structure 1 for an injecting molding machine of the present invention, as shown in FIG. 1, is positioned between a receiving disc 2 and a movable mold base 3, moved by an oil pressure cylinder 4 to push forward or pull back the movable mold base 3 in closing and opening the mold. The oil pressure cylinder 4 and the movable mold base 3 are not to be described here, as they are not claimed in this application. The receiving disc 2 and the movable mold base 3 have respectively plural position plates 21, 31 to pivotally connect two ends of arms 11, 12 of the arm structure 1.

Figure 2:
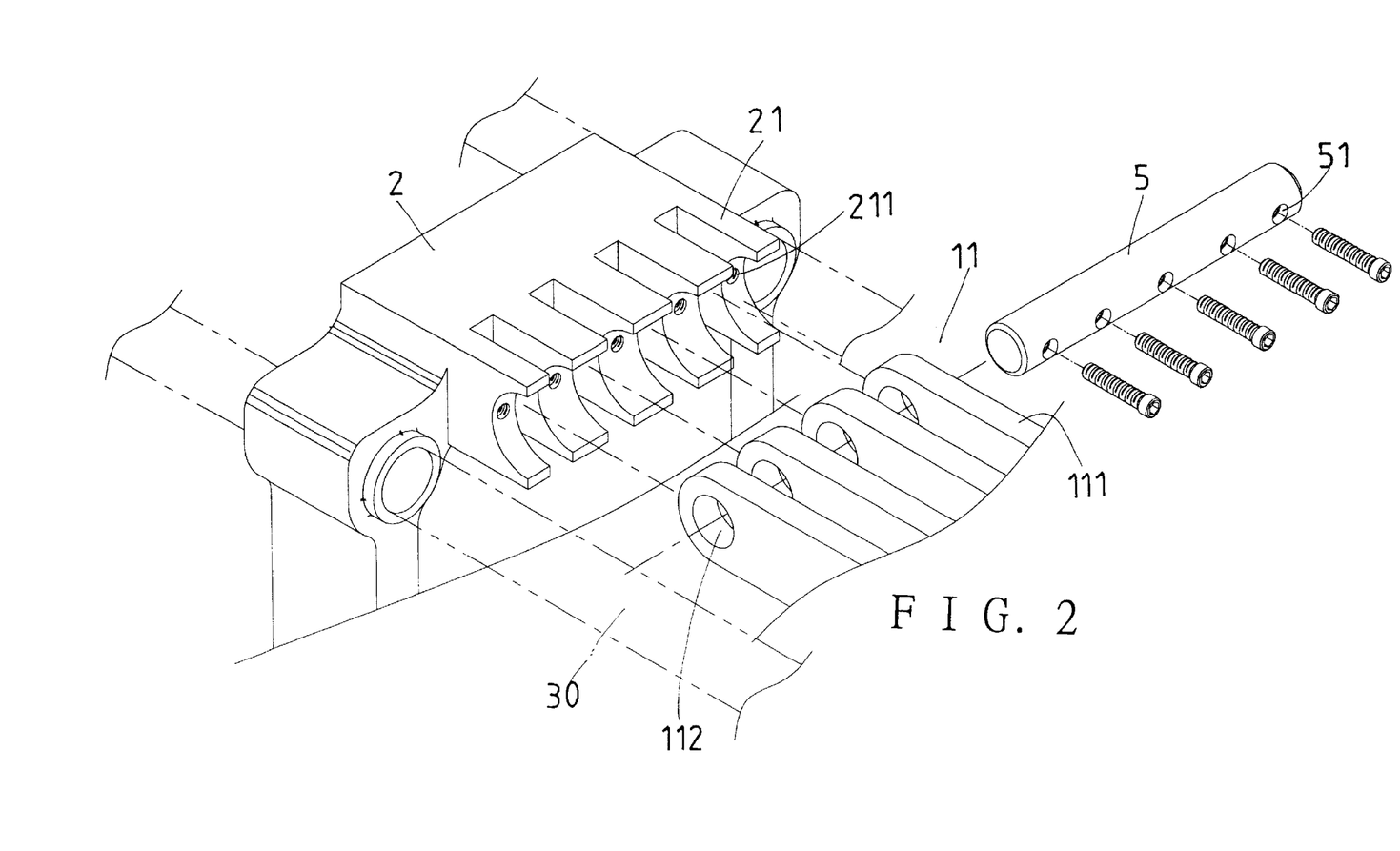
FIG. 2 is an exploded perspective view of the arm structure for an injecting molding machine of the present invention.
Figure 3:
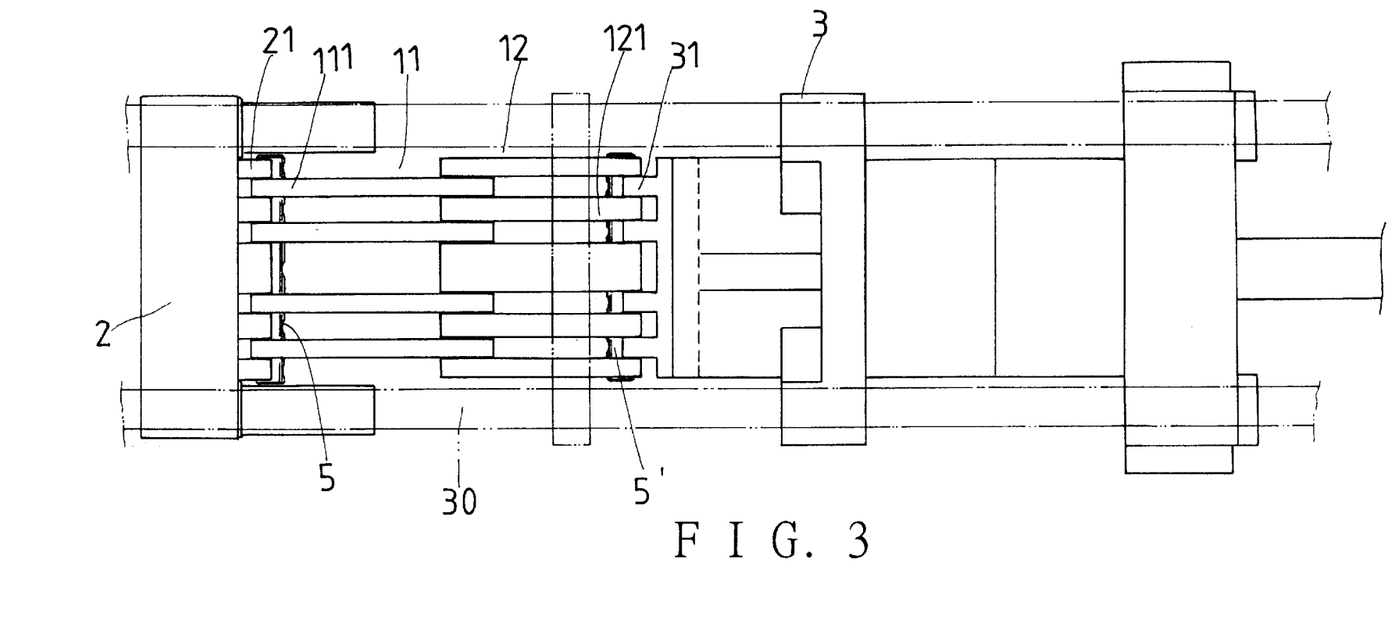
FIG. 3 is an upper view of the arm structure for an injecting molding machine of the present invention.
Figure 4:
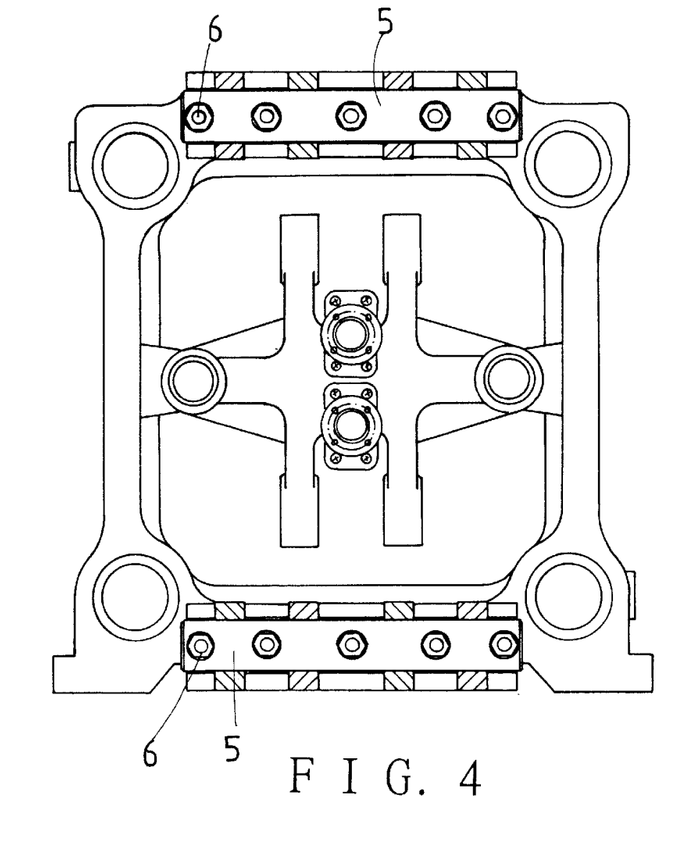
FIG. 4 is a side view of the arm structure for an injecting molding machine of the present invention.

Each position plate 21 or 31 of the receiving disc 2 and the movable mold base 3 has an outer end concave surface with a threaded hole 211, 311, as shown in FIG. 2, wherein the receiving disc 2 and the arms 11 are shown how to combine with one another, and the movable mold base 3 is combined with the other arms 12 in the same way, so the movable mold base 3 and the arms 12 are not shown in FIG. 2. The arms 11 and 12 of the arm structure 1 respectively have plural parallel pivotal plates 111 and 121 respectively bored with a pivot hole 112 or 122 aligned. Further each pivotal plate 111 or 121 fits in a gap defined between every two position plates 21 or 31 of the receiving disc 2 or the movable mold base 3. Then a tubular pivot 5 or 5' respectively extends in the pivot holes 112 or 122 of the pivotal plates 111 or 121, and each tubular pivot 5 or 5' has plural through holes 51 or 51' for a bolt 6 to pass through to screw with the threaded hole 211 or 311 to secure the tubular pivot 5 or 5' with the outer end concave surface of each position plate 21 or 31, as shown in FIGS. 3 and 4.

In assembling the arm structure 1, the pivot 5 or 5' is made to protrude the pivot hole 112 or 122 of each pivotal plate 111 or 121 of the arm 11 or 12, and then each pivotal plate 111 or 121 respectively is placed in each gap between every two position plates 21 or 31 of the receiving disc 2 or the movable mold base 3, with the through hole 51 or 51' of each tubular pivot 5 or 5' correspond to the threaded hole 211 or 311 of each position plate 21 or 31 for the bolt 6 to pass through and screw with the threaded hole 211 or 311 of each position plate 21 or 31. Next, the tubular pivot 5 or 5' together with the arm 11 or 12 are combined between the receiving disc 2 and the movable mold base 3.

Figure 5:
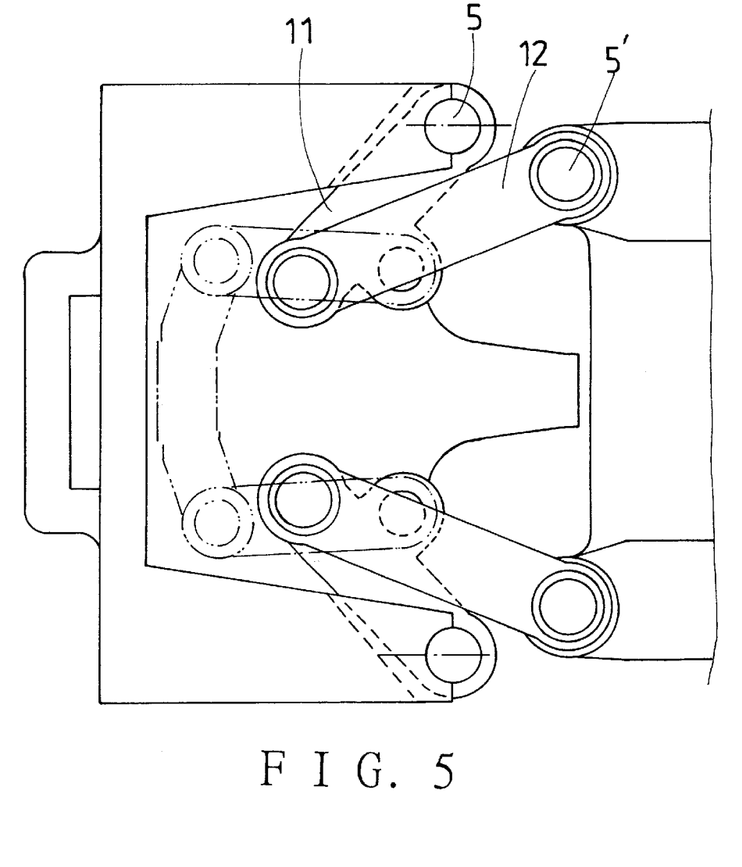
FIG. 5 is a front view of the arm structure retreating back of the resent invention.

When the oil pressure cylinder 4 is operated to move the arm structure 1 forward or backward, as shown in FIGS. 1 and 5, bias turning the arms 11 and 12 with the tubular pivots 5, and 5' fixed on the position plates 21 and 31. Whenever the arm structure 1 is to be taken off for maintenance or repair, only screw off the bolts 6 from the position plates 21 and 31. Then the arm structure 1 can be easily taken off.

Figure 6:
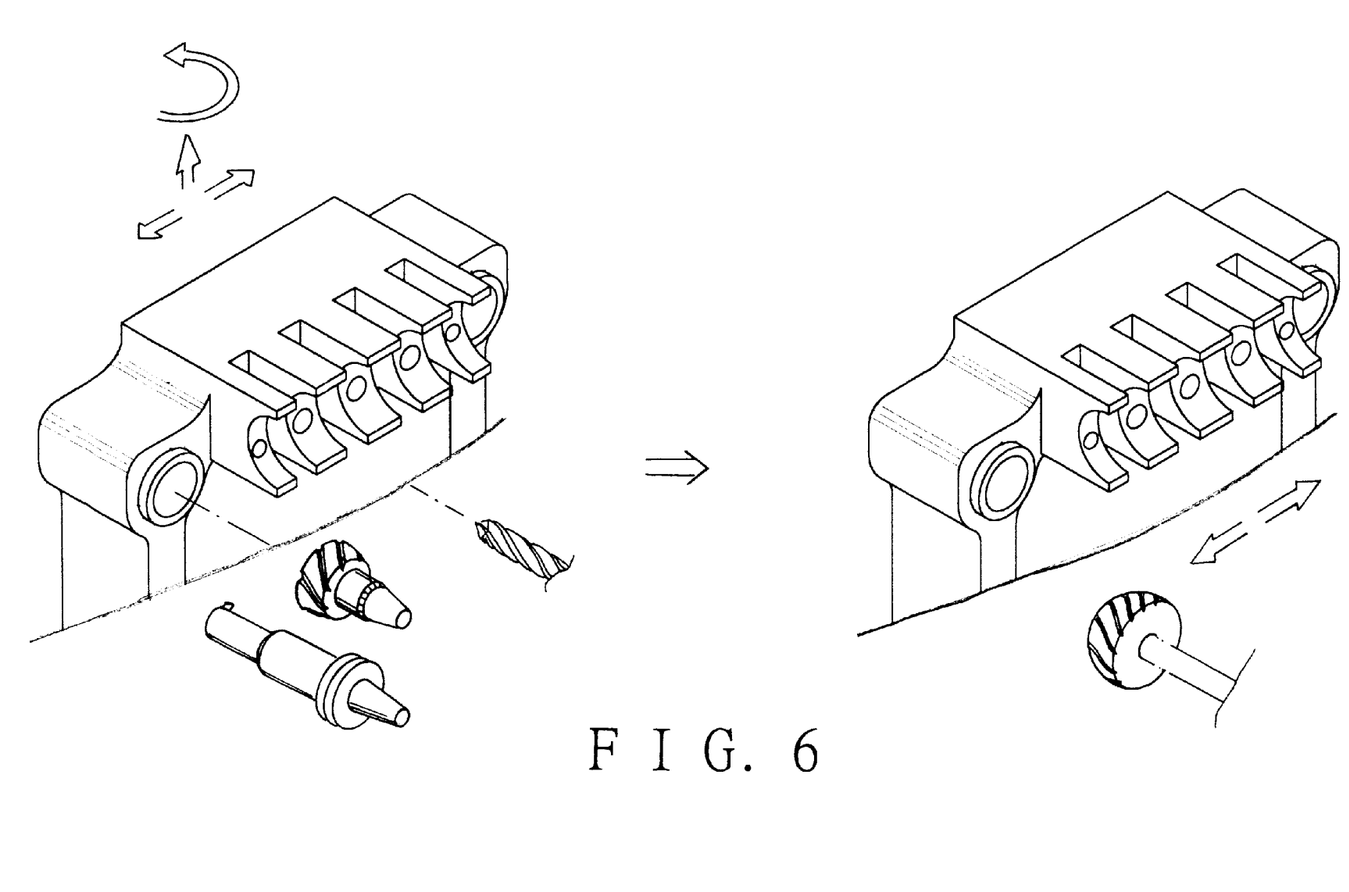
FIG. 6 is a perspective view of processing the arm structure for an injecting molding machine of the present invention.

In boring process of the threaded holes 211, 311 of the position plates 21, 31 of the receiving disc 2 and the movable mold base 3, only aligning the receiving disc 2 or the movable mold base 3 on the work table once is enough to bore the outer end concave surfaces and boring directly the through holes by moving straightly the receiving disc or the movable mold base, finishing all the outer end concave surfaces of the all position plates 21 and 31 and all the through holes for the connecting rods.

In general, taking the arm structure 1 into pieces does not need removing the connecting rods, largely increasing convenience in maintaining or repair, enhancing efficiency in maintenance and repair, and subsequently reducing time needed for stopping an injecting molding machine. Further, in manufacturing process, one time of aligning the receiving disc and the movable mold base for boring holes is enough shortening processing work.

What is claimed is:

1. An arm structure for an injecting molding machine comprising two pairs of two arms respectively consisting of plural parallel pivotal plates, two ends of said pivotal plates pivotally connected between a receiving disc and a movable mold base, said receiving disc and movable mold base respectively having plural parallel position plates defining a gap between every two of them, said two ends of said pivotal plates respectively fitting in said gaps and pivotally connected with a tubular pivot, an oil pressure cylinder provided to move a rod structure cooperating with said two pairs of arms and then subsequently said movable mold base forward or backward to close or open a mold; each said position plate of said receiving disc and said movable mold base having an outer end concave surface bored with a threaded hole, each said pivotal plate of said two pairs of two arms of said arm structure having a pivot hole in an outer end for said tubular pivot to pass through, each said tubular pivot having plural through holes spaced apart and corresponding to said threaded holes of said position plates for bolts to pass through and screw with said threaded holes in said outer end concave surfaces of said position plates to combine each said tubular pivot with said position plates of said receiving disc and said movable mold base and with said pivotal plates of said two pairs of two arms, thus said arm structure possible to be taken off said receiving disc and said movable mold base without need of removing said rod structure to shorten assembling or disassembling said arm structure with or from said receiving disc and with or from said movable mold base of an injecting molding machine.

* * * * *